United States Patent
Fugiel et al.

(10) Patent No.: US 6,599,630 B1
(45) Date of Patent: Jul. 29, 2003

(54) ELIMINATING ADHESION DIFFERENCE DUE TO GLASS ORIENTATION IN LAMINATED SAFETY GLASS

(75) Inventors: Richard Anthony Walter Fugiel, Washington, WV (US); John W. Turnbull, Wilmington, DE (US); Bert C. Wong, Marietta, OH (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/701,107

(22) PCT Filed: May 22, 1998

(86) PCT No.: PCT/US98/10580
§ 371 (c)(1),
(2), (4) Date: Nov. 21, 2000

(87) PCT Pub. No.: WO99/61243
PCT Pub. Date: Dec. 2, 1999

(51) Int. Cl.[7] ............................................. B32B 17/10
(52) U.S. Cl. ...................... 428/437; 156/99; 156/106; 428/436
(58) Field of Search ................... 428/436, 437; 156/99, 106

(56) References Cited

U.S. PATENT DOCUMENTS 4,952,457 A * 8/1990 Cartier et al. ............ 428/425.6
5,728,472 A * 3/1998 D'Errico ..................... 428/436

* cited by examiner

Primary Examiner—D. S. Nakarani
(74) Attorney, Agent, or Firm—Kevin S. Dobson

(57) ABSTRACT

A laminar structure comprised of at least two layers FORCE (16, 20) of glass and a sheet (18) of plasticized PVB containing an adhesion control additive is provided wherein the difference in adhesion between the PVB interlayer and the glass due to glass orientation is minimized by including a leveling agent in the bulk or on the surface of the sheet of plasticized PVB or by coating the leveling agent onto the glass prior to laminating.

15 Claims, 1 Drawing Sheet

ELIMINATING ADHESION DIFFERENCE DUE TO GLASS ORIENTATION IN LAMINATED SAFETY GLASS

BACKGROUND OF THE INVENTION

Adhesion between the glass and the interlayer is the most critical, controllable parameter related to the penetration resistance of laminated safety glass. If the adhesion is too high, the laminate fails as a monolithic unit upon impact, and hence does not offer the occupant of a motor vehicle much protection. If the adhesion is too low, sharp pieces would separate from the laminate on impact, and could thus cause injury to the occupant.

Laminated safety glass today are mainly made from float glass. For example, the automobile windshield is made from two pieces of float glass which have been bent either by heat sagging or by heating followed by form-pressing. The bent glass pieces are bonded together by a plasticized polyvinylbutyral (PVB) interlayer. In the manufacture of float glass, the glass is cast onto and transported on top of a bath of molten tin. While one of the surfaces is in contact with tin (the tin-side), the other is usually in contact with an inert atmosphere such as nitrogen (the air-side). Consequently, the chemistry of the two surfaces of the same glass sheet can be quite different. Sometimes, the difference in surface chemistry manifests itself in the adhesion between the glass and the PVB interlayer. One gets higher or lower adhesion depending on whether the "tin" side or the "air" side of the glass is in contact with the PVB interlayer, among other factors such as PVB moisture, inherent adhesivity of the interlayer, bulk glass chemistry. The difference in adhesion, often referred to as asymmetric adhesion, can be so much that a laminate is deemed usable as a windshield in one glass orientation, but not in another. Some laminators are frustrated with having to identify and keep track of the glass orientation, or having to install extra equipment to flip the glass to achieve a certain prescribed orientation.

It is therefore an object of this invention to provide a laminar structure which is usable as windshields and sideglass in automobiles such that the difference in adhesion between the PVB interlayer and the tin-side and that between the PVB and the air-side of the glass is reduced. This invention is also applicable to other glass/adhesive sheet laminar structures in which asymmetric adhesion is experienced.

SUMMARY OF THE INVENTION

In accordance with this invention there is provided a glass/adhesive sheet laminar structure comprising at least two layers of glass and a sheet of plasticized polyvinylbutyral (PVB), said polyvinylbutyral having blended therein an ionizable metal salt as an adhesion control additive to provide a preselected level of adhesion between said layers of glass and said sheet of polyvinylbutyral which is suitable for use as automobile windshields and side windows and body glass, and incorporating another ionizable metal salt which provides a cation different from that provided by the adhesion control additive such that the content of the cation which is provided by the leveling agent is between 0.03 and 1.35, and preferably 0.07 to 1.1 milliequivalents/kg (meq/kg) of sheeting. The second metal salt may be a salt of an alkaline earth metal such as magnesium or calcium or a transition metal such as zinc or copper, or Group IV metal such as tin. Surprisingly, this small amount of salt or leveling agent is adequate in reducing, and in some cases, essentially eliminating asymmetric adhesion without other deleterious effects on the overall performance on the laminate such as haze. Moreover, the adhesion level of the PVB interlayers may be controlled by conventional means by adjusting the amount of adhesion control additive.

BRIEF DESCRIPTION OF THE DRAWING

In describing the invention, reference will be made to the accompanying drawing in which.

DETAILED DESCRIPTION

Figure 1:
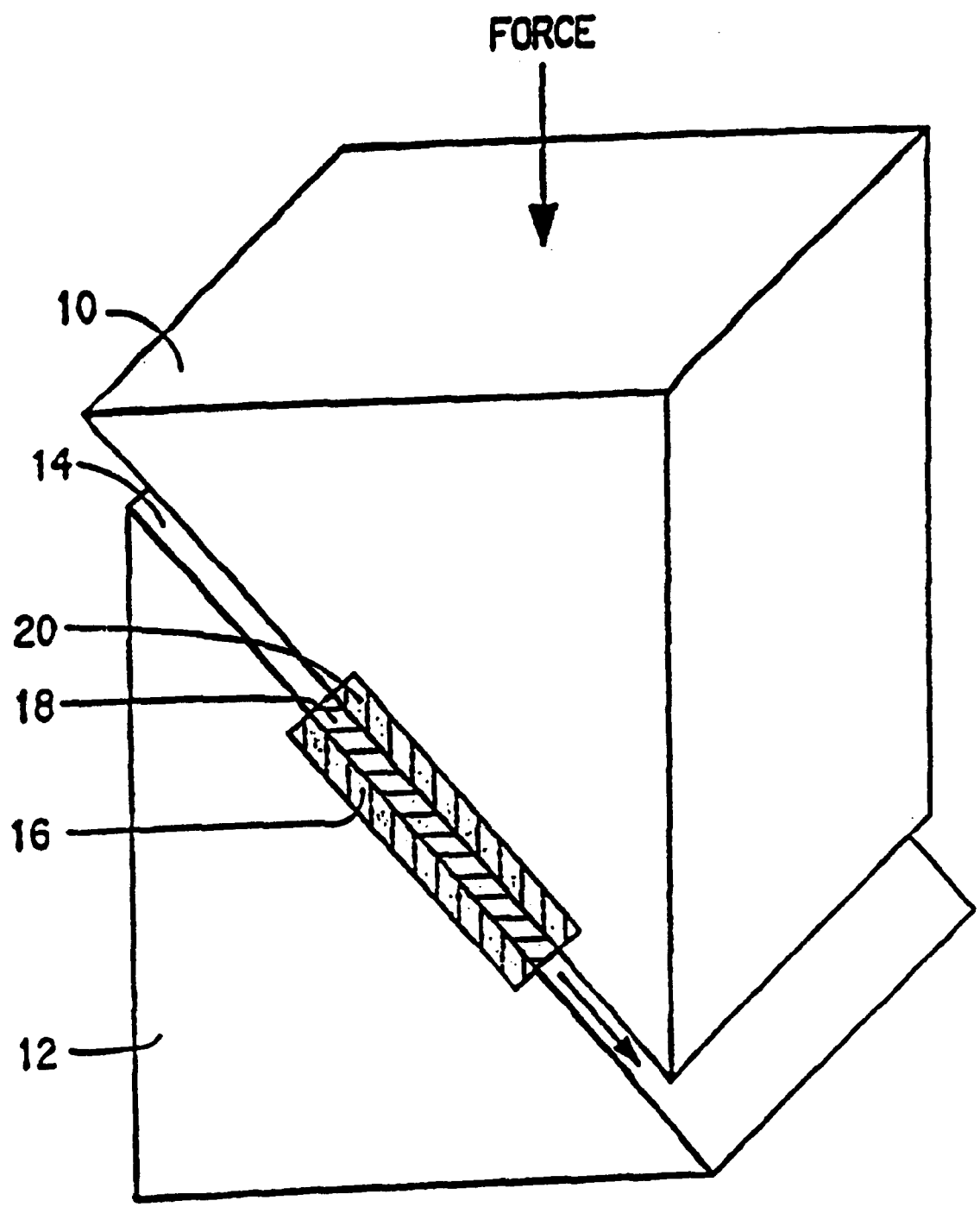
FIG. 1 is a diagrammatic illustration of a jig used for determining the compressive shear strength of a laminate.

Plasticized PVB sheeting is prepared by processes well known in the art. Preparation of plasticized PVB is disclosed in Phillips, U.S. Pat. No. 4,276,351 which is hereby incorporated by reference. A wide variety of adhesion control additives can be used with polyvinylbutyral sheeting. In the instant invention a PVB sheet plasticized with a compatible quantity of glycol ester selected from the group consisting of triethyleneglycol di-n-heptanoate and tetraethylene glycol di-n-heptanoate, or with a compatible quantity of branched or unbranched glycol di-esters such as triethylene glycol di-2-ethylbutyrate and triethylene glycol di-2-ethylhexanoate, and contains as an adhesion control additive an alkali metal carboxylate such as potassium formate, acetate and the like. A process for preparing such sheeting is disclosed in Moynihan, U.S. Pat. No. 4,292,372 which is hereby incorporated by reference.

In the examples of this invention, 100 parts of dry PVB flake of nominally 23% by weight of non-butyralated vinyl alcohol groups are mixed with 36–40 parts of tetraethylene glycol di-n-heptanoate plasticizer containing a light stabilizer (Tinuvin-P or other suitable compounds) and an antioxidant which are pre-mixed in the plasticizer continuously in a twin-screw extruder. The melt exiting the extruder is at 200–220° C. It is passed through a gear pump and a melt filter, and then through a slot die and forms a sheeting of 0.76 mm nominal thickness. The adhesion control additive is added as an aqueous side-stream directly into the melt. The leveling agent, if it is water-soluble, is added either as a direct aqueous side-stream into the melt, or preferably as a mixed solution combined with the adhesion control additive. If the leveling agent is not readily soluble in water, it may be added as a solution in an organic solvent directly into the melt or as a solution in the plasticizer which is fed to the extruder.

As used herein, the term, inorganic acids, includes sulfuric acid, nitric acid, and hydrochloric acid. Monobasic organic acids include formic acid, acetic acid, as well as linear carboxylic acids having 1–12 carbon atoms and branched carboxylic acids having 3–12 carbon atoms. Polybasic organic acids refer to acids with two or more carboxylic acid groups, and they encompass oxalic acid, succinic acid, oxaloacetic acid, citric acid, and ethylenediamine tetraacetic acid.

In addition to an adhesion control additive and a leveling agent, usual adjuvants such as antioxidants, colorants and ultraviolet absorbers which do not adversely affect the functioning of the adhesion control additive may be included in the PVB composition. In addition, surface energy modifying agents consisting of silicones, hydrolyzed silanes, fluorine-containing surfactant, salts of a medium-to long-chain carboxylic acid or a combination thereof may be added for reducing air-related defect. Air-related defects in the laminate include air bubbles and worm-like defects which form as a result of having trapped air and air absorbed into the PVB interlayer during autoclaving.

Fabrication of the laminar structures is well known in the art. It is also known that in order to effectively remove most of the air from between the surfaces in the laminar structure, the surface of the PVB sheeting should be roughened. This can be effected mechanically by embossing or by melt fracture during extrusion of the PVB sheet. Retention of the surface roughness is essential to facilitate effective deaeration of the entrapped air during laminate preparation. (Surface roughness, Rz, is expressed in microns by a 10-point average roughness in accordance with ISO-R468 of the International Organization for Standardization. For sheeting having a thickness greater than about 0.030 inch (0.76 mm), 10-point average roughness, Rz, of up to 60 microns is sufficient to prevent air entrapment. To prevent blocking a minimum roughness of about 20 microns is needed if the sheeting is to be wound up in a roll without interleaving or without anti-blocking agents. The surface roughness of thermoplastic resin sheeting and the methods of characterization and quantification of the surface roughness are described in ANSI/ASME B46. 1 (1995).

Adhesion Testing

Adhesion of the laminate, i.e. of the PVB interlayer to glass, is determined using the compressive shear strength test using jig 10, 12 shown in FIG. 1. Laminates for adhesion determination are prepared by first conditioning the polyvinylbutyral interlayer at 23° C.±2° C. in an environment of 23±3% relative humidity overnight before laminating. Referring to FIG. 1, interlayer 18 is then sandwiched between two pieces of annealed float glass 16 and 20 of dimension 12"×12" (305 mm×305 mm) and 2.3 mm nominal thickness which have been washed and rinsed in demineralized water. Two laminates are made from each PVB interlayer: one with the interlayer with both the tin-sides of the glass pieces (ATTA); one with the interlayer in contact with both the air-sides of the glass pieces (TAAT). The glass/PVB/glass assemblies are then heated in an oven set at 90–100° C. for 30 minutes. Thereafter, each is passed through a set of nip rolls so that the air in the void spaces between the glass and the interlayer may be squeezed out, and the edge of the assembly sealed. The assembly at this stage is called a pre-press. The pre-press is then placed in an air autoclave where the temperature is raised to 135° C. and pressure to 200 psig (14.3 bar). These conditions are maintained for 20 minutes, after which, the air is cooled, while no more air is added to the autoclave. After 20 minutes of cooling when the air temperature in the autoclave is under 50° C., the excess air pressure is vented.

The compressive shear strength of the laminate prepared as prescribed above is determined using the method detailed here. Six 1"×1" (25 mm×25 mm) chips are sawed from the laminate. The chips are conditioned in a room controlled at 23° C.±2° C. and 50%±1% relative humidity for one hour prior to testing. The compressive shear strength of the chip is determined using jig 12 shown in FIG. 1. The chip, 16, 18, 20, is placed on the cut-out on the lower half of jig 12, and the upper half is then placed on top of the chip. A cross-head is lowered at the rate of 0.1 inch per minute (2.5 mm per minute) until it contacts the upper piece of the device. As the cross-head continues to travel downward, one piece of glass of the chip begins to slides relative to the other. The compressive shear strength of the chip is the shear stress required to cause adhesive failure. The precision of this test is such that one standard deviation is typically 6% of the average result of six chips. A glass/PVB/glass laminate tested in this way for adhesion which has compressive shear strength of 1500 psi to about 2700 psi (1050 N/cm$^2$ to 1850 N/cm$^2$) is considered most suitable for use in automobile windshields and side-glass.

Accelerated Haze Measurement

A laminate is made from each PVB interlayer tested. The TAAT orientation is used. The laminate is assembled and de-aired as discussed in the adhesion section, except that a hotter and longer autoclave cycle is used. The hold time is 90 minutes at 150° C. and 225 psig (15.3 bar) pressure. Haze is measured following the procedure described in ASTM D-1003 using a Hazegard hazemeter from Gardner. Haze levels higher than 0.4% are considered undesirable for use as windshields.

EXAMPLES

The following examples in which parts and percentages are by weight unless otherwise specified further illustrate this invention.

Comparative Examples C1 and C2

Plasticized polyvinylbutyral sheeting (commercially available from E.I. duPont de Nemours & Co. as Butacite®) in which the plasticizer was tetra-ethylene glycol di-heptanoate was used to prepare laminates in the method described above. Sheeting with two levels of adhesivity were used. Adhesion of the laminates made in two glass orientations (TAAT and ATTA) was measured.

Results are shown in Table 1

Comparative Example C3

100 parts by weight polyvinyl butyral was admixed in an extruder with 38.5 parts plasticizer doped with antioxidants (octylphenol) and ultraviolet light stabilizers (Tinuvin P). This composition is the same as that in Comparative Example 1. Potassium formate was added to the melt in the extruder as an adhesion control additive such that the potassium concentration in the sheeting was 250 parts per million by weight of the plasticized sheet. Adhesion results in both TAAT and ATTA orientations are shown in Table 1.

Example 1

The polyvinylbutyral interlayer in this example was similar to that in Example C3, except that a leveling agent, magnesium sulfate, was added such that the concentration of magnesium was 0.40 meq/kg. Adhesion and haze results are shown in Table 1.

Example 2

The polyvinylbutyral interlayer in this example is similar to that in Example 1, except that sheeting was made by feeding the adhesion control additive, potassium formate, and the leveling agent, magnesium sulfate, as a mixed solution. The resulting potassium level in the sheeting was 381 ppm, and the magnesium level was 0.11 meq/kg. Adhesion and haze data are shown in Table 1.

Example 3

The polyvinyl butyral interlayer in this example was the similar to that used in Example 1, except that the potassium level of the adhesion control additive was 300 ppm, and magnesium neodecanoate was added as a leveling agent to the melt in the extruder as a solution in mineral spirits and plasticizer so that the magnesium concentration in the bulk of the PVB sheeting was 0.50 meq/kg. Adhesion and haze results are shown in Table 1.

Example 4

The polyvinylbutyral interlayer in this example was similar to that in Example 2, except that the potassium concentration from the adhesion control additive, potassium formate, was 405 ppm, and that a leveling agent disodium magnesium ethylenediamine tetracetate was added such that the concentration of magnesium was 0.14 meq/kg in the sheeting. Laminates were prepared and adhesion was measured. Results are shown in Table 1.

Example 5

The polyvinylbutyral interlayer in this example is the same as that in Example 1 in that the potassium level from the potassium formate adhesioncontrol additive was 350 ppm, but the leveling agent was magnesium from magnesium acetate. The magnesium level in the sheeting was 0.58 meq/kg. Adhesion and data are shown in Table 1.

Example 6

The polyvinyl butyral interlayer in this example was the similar to that used in Example 3, except that the potassium level from the adhesion control additive was 400 ppm, and 0.007 part of γ-glycidoxypropyltrimethoxy silane and 0.07 part of polyoxyethylene-modified silicone oil was also added as surface energy modifiers, and the concentration of magnesium in the bulk of the PVB sheeting was 1.0 meq/kg. Adhesion and haze results are shown in Table 1.

Example 7

The polyvinyl butyral interlayer in this example was the similar to that used in Example 1 except that the potassium level in the bulk of the sheeting due to the adhesion control additive was 300 ppm, and calcium acetate was added as the leveling agent so that the calcium concentration in the bulk of the PVB sheeting was 1.0 meq/kg. Adhesion and haze results are shown in Table 1.

Example 8

The polyvinyl butyral interlayer in this example was the similar to that used in Example 7, except that zinc acetate was used as an leveling agent. It was added so that the zinc concentration in the bulk of the PVB sheeting was 0.83 meq/kg. Adhesion and haze results are shown in Table 1.

Example 9

The polyvinylbutyral interlayer in this example (commercially available material under the tradename Butacite®) was the same as that used in Comparative Example C1, except that the interlayer was dip-coated in a bath containing a 0.012% aqueous solution of magnesium sulfate at 25 ft/minute (7.6 m/minute). The resulting sheeting was analyzed by ion chromatography and was found to contain 0.17 meq/kg of magnesium on a bulk basis. The resulting sheeting was 10 dried and conditioned in an environment of 23±2% relative humidity prior to laminating. Adhesion results are shown in Table 1.

Example 10

The polyvinylbutyral interlayer in this example was the same as that in Comparative Example C1. However, the glass was dipped in a solution of magnesium sulfate in demineralized water and dried before laminating. The concentration of the magnesium ions in the solution was 10 mg/liter. Adhesion of the laminates in TAAT and ATTA orientations were measured. Data are shown in Table 1. It was surprising that such a low concentration of magnesium ions 10 parts per million in the solution was able to substantially lower the difference in adhesions between the two glass orientations.

Comparative Example C4

The polyvinyl butyral interlayer in this example was similar to that used in Example 1, except the potassium level from the adhesion control additive was 300 ppm and the magnesium level from the leveling agent is 1.5 meq/kg. Adhesion and haze results are shown in Table 1. The haze level was also high enough that such a laminate may not be preferred as automotive windshields.

Comparative Example C5

The polyvinyl butyral interlayer in this example was made in the same way as that in Comparative Example C3 except that magnesium in the from of magnesium fornate was used as the sole adhesion control additive. The magnesium level was 4.2 meq/kg. No other leveling agent was used. Adhesion and haze results are in Table 1. Adhesion in the ATTA orientation was higher than that in the TAAT orientation. This shows that the use of magnesium alone does not have the desired leveling effect.

Comparative Example C6

The polyvinylbutyral interlayer in this example was the same as that in Example 2 except that no leveling agent was added. The level of potassium from the adhesion control additive, potassium formate, was 385 ppm. Adhesion in this example is lower than that in Example 2 although the concentrations of adhesion control additive in both were nearly identical. This shows that the magnesium in the PVB interlayer in Example 2 did not act as an adhesion control additive, but rather as a agent to temper the effect due to glass orientation in the laminate.

TABLE 1

| | Leveling Agent | | | Adhesion CSS (psi) | | | |
| | Cation | | | | | | |
| Example | Type | meq/kg | Anion | TAAT | ATTA | %-Difference | Haze |
| --- | --- | --- | --- | --- | --- | --- | --- |
| C1 | — | | — | 4199 | 2953 | 30 | 0.13 |
| C2 | — | | — | 3615 | 2005 | 45 | 0.17 |
| C3 | — | | — | 5072 | 2439 | 52 | 0.26 |
| 1 | Mg | 0.4 | Sulfate | 3135 | 2604 | 17 | 0.31 |
| 2 | Mg | 0.11 | Suliate | 1966 | 1641 | 17 | 0.20 |

TABLE 1-continued

| | Leveling Agent | | | Adhesion CSS (psi) | | | |
| --- | --- | --- | --- | --- | --- | --- | --- |
| | Cation | | | | | | |
| Example | Type | meq/kg | Anion | TAAT | ATTA | %-Difference | Haze |
| 3 | Mg | 0.5 | Neodecanoate | 2355 | 2084 | 12 | 0.17 |
| 4 | Mg | 0.28 | EDTA | 2764 | 2421 | 12 | 0.16 |
| 5 | Mg | 0.58 | Acetate | 2132 | 1923 | 10 | 0.16 |
| 6 | Mg | 1 | Neodecanoate | 1887 | 1769 | 6 | 0.23 |
| 7 | Ca | 1 | Acetate | 2452 | 2460 | 0 | 0.18 |
| 8 | Zn | 0.83 | Acetate | 1426 | 1509 | −6 | 0.12 |
| 9 | Mg | 0.17 | Sulfate | 3246 | 3270 | −1 | 0.17 |
| 10 | Mg | trace on glass | Sulfate | 2302 | 2125 | 8 | 0.17 |
| C4 | Mg | 1.5 | Sulfate | 2528 | 2316 | 8 | 0.57 |
| C5 | — | — | — | 2798 | 3524 | −26 | 0.19 |
| C6 | — | — | — | 1544 | — | — | — |

What is claimed is:

1. A glass/adhesive sheet laminate comprising at least two layers of glass and a sheet of plasticized polyvinylbutyral positioned therebetween, said polyvinylbutyral having incorporated therein as an adhesion control additive an alkali metal salt to provide a preselected level of adhesion between said layers of glass and said sheet of polyvinylbutyral wherein asymmetric adhesion is present between the layers of glass and adjoining surfaces of the sheet of polyvinylbutyral, and as a leveling agent a different metal salt in an amount to provide a concentration of cation from the different metal salt in the PVB interlayer of 0.03–1.35 meq/kg, said amount being sufficient to reduce asymmetric adhesion between the plasticized interlayer and the adjoining surfaces of glass.

2. A laminar structure of claim 1 wherein said leveling agent is an alkaline earth metal salt of an inorganic acid or an organic acid.

3. A laminar structure of claim 1 wherein said leveling agent is a transition metal salt or a tin salt of an inorganic acid or an organic acid.

4. A laminar structure of claim 1 wherein said adhesion control additive is a potassium salt of an organic acid or potassium salts of organic acids.

5. A laminar structure in claim 1 wherein the leveling agent is an alkaline earth metal, transition metal, or tin salt of a monobasic organic acid.

6. A laminar structure in claim 1 wherein the plasticizer is a glycol ester.

7. A plasticized polyvinylbutyral sheeting in a laminar structure in claim 1 having incorporated therein as plasticizer a glycol ester, as an adhesion control additive an alkali or alkaline metal salt to provide a preselected level of adhesion between said layers of glass and said sheet of polyvinylbutyral wherein asymmetric adhesion is present between the layers of glass and adjoining surfaces of the sheet of polyvinylbutyral, and as a leveling agent an alkaline metal salt in an amount to provide a concentration of cation from the different metal salt in the PVB interlayer of 0.03 to 1.35 meq/kg, said amount being sufficient to reduce asymmetric adhesion between the plasticized interlayer and the adjoining surfaces of glass.

8. The polyvinylbutyral interlayer of claim 7 wherein said leveling agent is an alkaline earth metal or transition salt of an inorganic acid or of an organic acid.

9. A glass/adhesive sheet laminate comprising at least two layers of glass and a sheet of plasticized polyvinylbutyral positioned therebetween, said polyvinylbutyral having incorporated therein as an adhesion control additive an alkali metal salt to provide a preselected level of adhesion between said layers of glass and said sheet of polyvinylbutyral wherein asymmetric adhesion is present between the layers of glass and adjoining surfaces of the sheet of polyvinylbutyral, and as a leveling agent a different metal salt in an amount to provide a concentration of cation from the different metal salt in the PVB interlayer of 0.03–1.35 meq/kg, said amount being sufficient to reduce asymmetric adhesion between the plasticized interlayer and the adjoining surfaces of glass wherein the leveling agent is an alkaline earth metal or transition metal salt of a polybasic organic acid.

10. In a process for minimizing asymmetric adhesion between a polyvinylbutyral interlayer and glass in a glass/adhesive sheet laminate comprised of at least two layers of glass and a sheet of plasticized polyvinyibutya adhesive, the steps of preparing a bulk composition of plasticized polyvinyibutyral containing an alkali metal salt as an adhesion control additive which provides a preselected level of adhesion between said glass and said sheet, incorporating a second metal salt different from said adhesion control additive as a leveling agent in an amount to provide a concentration of cation from the different metal salt in the polyvinylbutyral sheet of 0.03 to 1.35 meq/kg, forming a laminar structure by adhering said sheet to a glass plate, de-airing the structure and sealing said sheet and glass plate by applying heat and pressure thereto.

11. The process of claim 10 wherein said leveling agent is an alkaline earth metal or a transition metal or a tin salt of an inorganic acid or of an organic acid.

12. The process of claim 10 wherein said adhesion control additive is selected from the group consisting of potassium formnate, potassium acetate, and other potassium salts.

13. In a process for minimizing asymmetric adhesion between a polyvinylbutyral interlayer and glass in a glass/adhesive sheet laminate comprised of at least two layers of glass and a sheet of plasticized polyvinylbutyral adhesive, the steps of preparing a bulk composition of plasticized polyvinylbutyral containing an alali metal salt as an adhesion control additive which provides a preselected level of adhesion between said glass and said sheet, and the glass having been coated with a leveling agent which is dissolved in a solution containing 2 parts per million by weight of metal ions, forming a laminar structure by adhering said sheet to a glass plate, de-airing the structure and sealing said sheet and glass plate by applying heat and pressure thereto.

14. The process of claim 13 in which the cation of the leveling agent is magnesium, calcium, zinc, or tin, and anions are moieties of monobasic or polybasic organic acids.

15. The process of claim 13 in which two or more leveling agents with different cations are used in combination.

* * * * *